E. M. ROSENBLUTH.
AUTOMOBILE.
APPLICATION FILED APR. 2, 1915.
1,173,123.
Patented Feb. 22, 1916.
*FIG. I.*
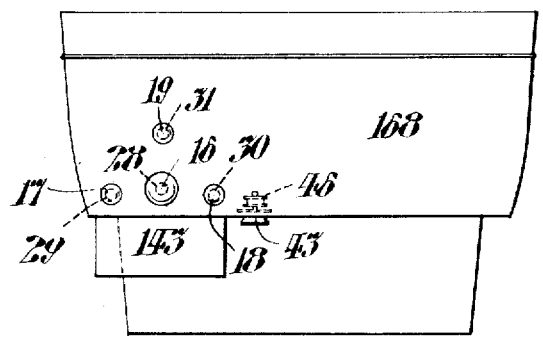
*FIG. II.*
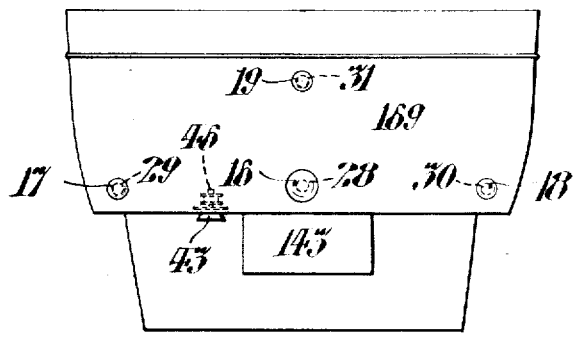
*FIG. III.*
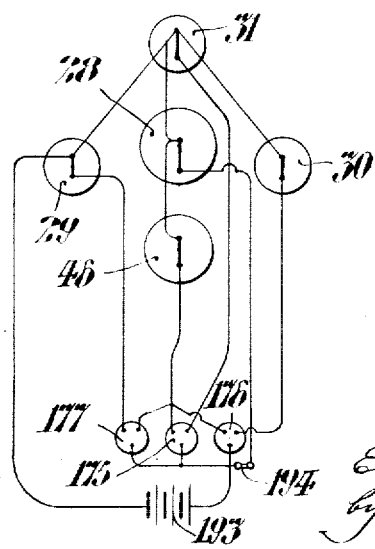
WITNESSES:
Philip U. Vessey
Joseph E. Legel
INVENTOR:
Edwin M. Rosenbluth,
by Arthur E. Paige,
Attorney.

UNITED STATES PATENT OFFICE.

EDWIN M. ROSENBLUTH, OF PHILADELPHIA, PENNSYLVANIA.

AUTOMOBILE.

1,173,123.  Specification of Letters Patent.  Patented Feb. 22, 1916.

Original application filed February 28, 1911, Serial No. 611,410. Divided and this application filed April 2, 1915. Serial No. 18,665.

*To all whom it may concern:*

Be it known that I, EDWIN M. ROSENBLUTH, a citizen of the United States, residing at Philadelphia, in the State of Pennsylvania, have invented a certain new and useful Improvement in Automobiles, whereof the following is a specification, reference being had to the accompanying drawing.

This application is a division of my application Serial #611,410, filed February 28, 1911 for Letters Patent of the United States for improvements in vehicle signaling devices, and is limited to a device including a lamp or lamps located within the body of the vehicle and displayed through an opening or openings in said body; such a device being advantageous in that it may be primarily included as a permanent part of the vehicle structure.

This invention is particularly applicable to a motor vehicle to display the license number of the same, indicate the intended movement or stoppage of the vehicle, and manifest an audible alarm, and includes, at the rear of the vehicle, a holder for a license number plate and a group of lamps, one of which being continuously maintained lighted, to manifest a constant signal, also illuminates said number plate; the other lamps being intermittently lighted to respectively indicate that the vehicle is about to move to the right or left, or stop.

As hereinafter described, said lamps are incandescent electric lamps included in circuits with a triple push button switch; and my invention includes an audible alarm automatically operative by an electric motor in circuit with said push button switch and energized by the same source of electricity as said lamps. Moreover, said audible alarm energized by the same source of electricity as to be actuated upon the operation of either of the three members of the push button switch. That is to say, it may be operated contemporaneously with the intermittent operation of each of the lamps indicating movement or stoppage of the vehicle, without other manipulation than that necessary to indicate said movement or stoppage.

My invention includes the various novel features of construction and arrangement hereinafter more definitely specified.

In the drawing: Figure I is a rear elevation of a vehicle body having within it an embodiment of my invention including a group of lamps in coöperative relation with a license number plate holder and an audible alarm displayed through openings in said vehicle body. Fig. II is a rear elevation of a vehicle body similar to Fig. I but including a modified form of my invention. Fig. III is a wiring diagram for the forms of my invention shown in Figs. I and II.

Referring to the form of my invention shown in Fig. I; the lamp casings 16, 17, 18 and 19 having the lamps 28, 29, 30 and 31 arranged to manifest signals through openings in the rear of the vehicle body 168, and the electric horn 43 operated by the motor 46, are at the left hand side of said body; being the position usually occupied by the license plate and the lamp which illuminates it. However, in the form of my invention shown in Fig. II, (including the same elements as in Fig. I,) the openings in the vehicle body 169 are symmetrically disposed with reference to the body.

It is to be understood that in both forms of my invention shown the lights are continuously maintained in said lamp casings 16 to illuminate the number plates 143 and display a warning signal at the rear of the vehicle, and lights are intermittently produced in the casings 17, 18 and 19 to respectively indicate that the vehicle is about to turn to the left, to the right or stop.

Referring to Fig. III; I find it convenient to operate and control each of the signaling devices above described, by means of electric circuits which include the source of current 193 in such relation with the group of lamps that the central lamp may be maintained continuously lighted when the switch 194 is closed, and, the lamp 31 at the top of the group, indicating that the vehicle is about to stop, may be intermittently lighted by the operation of the central push button 175; the laterally disposed lamps indicating the direction of turning movement of the vehicle being respectively controlled by the push buttons 176 and 177, and, the audible alarm 43 being connected to be operated by each of said push buttons 175, 176 and 17 contemporaneously with the operation of the respective lamps connected therewith. It may be observed that the three push buttons in said switch are so electrically connected in each form of my signaling device that the central projecting button controls the stop signal, the buttons upon opposite sides thereof respectively control the signals indicating that the vehicle is about to turn to the right or left, and the audible alarm is connected to be operated by each of the three push buttons so that its operation is contemporaneous with the operation of each of the lamps in the group indicating movement or stoppage of the vehicle.

In each form of my invention, a lamp is continuously maintained lighted and lamps laterally disposed in respect thereto are intermittently lighted to respectively indicate the direction of movement of the vehicle. Incidentally, said continuously lighted lamp may serve to illuminate a license number plate, but I do not desire to limit myself to the specific arrangement as I believe it to be broadly new to provide a signaling device to indicate the intended movement of a vehicle consisting of a lamp which is continuously lighted and other lamps which are intermittently lighted to indicate by their location with respect to the continuously lighted lamp in which direction the vehicle is about to turn.

Although I have found it convenient to employ electric incandescent lamps, it is to be understood that lamps of different types may be employed, for instance, acetylene gas lamps which may be electrically lighted and extinguished by ordinary devices well known in the art.

I do not desire to limit myself to the precise details of construction and arrangement herein set forth as it is obvious that various modifications may be made therein without departing from the essential features of my invention as defined in the appended claims.

I claim:

1. The combination with a vehicle; of a signaling device inclosed by the vehicle body, including a holder for a license number plate, holders for a group of lamps and a holder for an audible alarm; a group of electric lamps including one whereby light may be transmitted upon a number plate attached to said holder, two upon opposite sides of said first lamp, and, a fourth lamp having means to manifest a stop signal; an audible alarm operatively connected with an electric motor; an electric switch; and, electric circuits including a source of current, said lamps, audible alarm and switch, in such relation that said first lamp may be maintained continuously lighted, the other three lamps may be respectively lighted by manipulation of said switch, and, said audible alarm may be operated contemporaneously with the operation of each of said other three lamps.

2. The combination with a vehicle; of a signaling device inclosed by the vehicle body, including a holder for a license number plate, and holders for a group of lamps and a holder for an audible alarm; a group of electric lamps including one whereby light may be transmitted upon a number plate attached to said holder, two upon opposite sides of said first lamp, and, a fourth lamp having means to manifest a stop signal; an audible alarm operatively connected with an electric motor; an electric switch; and, electric circuits including a source of current, said lamps, audible alarm and switch, in such relation that said first lamp may be maintained continuously lighted, the other three lamps may be respectively lighted by manipulation of said switch, and, said audible alarm may be operated.

3. The combination with a vehicle; of a signaling device inclosed by the vehicle body, including a holder for a license number plate, and holders for a group of lamps; a group of electric lamps including one whereby light may be transmitted upon a number plate attached to said holder, two upon opposite sides of said first lamp, and, a fourth lamp having means to manifest a stop signal; an electric switch; and, electric circuits including a source of current, said lamps, and switch, in such relation that said first lamp may be maintained continuously lighted, and the other lamps may be respectively lighted by manipulation of said switch.

4. The combination with a vehicle; of a signaling device inclosed by the vehicle body, including a holder for a license number plate, and holders for a group of lamps; a group of electric lamps including one whereby light may be transmitted upon a number plate attached to said holder, and two upon opposite sides of said first lamp; an electric switch; and, electric circuits including a source of current, said lamps, and switch, in such relation that said first lamp may be maintained continuously lighted, and the other lamps may be respectively lighted by manipulation of said switch.

5. The combination with a vehicle body; of a signaling device mounted within said body, including a group of electric lamps in registry with openings in said body; one of said lamps being intermediate of said group and having two lamps respectively upon opposite sides thereof, in spaced relation therewith, and one lamp above said intermediate lamp in spaced relation therewith; and an electric circuit including a source of current, said lamps and a switch, in such relation that said intermediate lamp may be maintained continuously lighted and the other lamps may be respectively lighted and extinguished by manipulation of said switch and respectively indicate that the vehicle is about to move to the right, to the left, or stop.

6. The combination with a vehicle body; of a signaling device mounted within said body, including a group of electric lamps in registry with openings in said body; one of said lamps being intermediate of said group and having two lamps respectively upon opposite sides thereof, in spaced relation therewith, and an electric circuit including a source of current, said lamps and a switch, in such relation that said intermediate lamp may be maintained continuously lighted and the other lamps may be respectively lighted and extinguished by manipulation of said switch.

In testimony whereof, I have hereunto signed my name at Philadelphia, Pennsylvania, this first day of April, 1915.

EDWIN M. ROSENBLUTH.

Witnesses:
E. G. McCullough,
M. B. Malcomson.

It is hereby certified that in Letters Patent No. 1,173,123, granted February 22, 1916, upon the application of Edwin M. Rosenbluth, of Philadelphia, Pennsylvania, for an improvement in "Automobiles," errors appear in the printed specification requiring correction as follows: Page 1, line 12, for the word "improvements" read *improvement;* same page, strike out line 41 and insert the words *motor may be so connected in the circuit as;* and that the said Letters Patent should be read with these corrections therein that the same may conform to the record of the case in the Patent Office.

Signed and sealed this 28th day of March, A. D., 1916.

[SEAL.]          J. T. NEWTON,

Cl. 177–337.          *Acting Commissioner of Patents.*